United States Patent

Rickard

[11] Patent Number: 6,037,678
[45] Date of Patent: Mar. 14, 2000

[54] COUPLING COMMUNICATIONS SIGNALS TO A POWER LINE

[75] Inventor: Robin Paul Rickard, Bishops Stortford, United Kingdom

[73] Assignee: Northern Telecom Limited, Montreal, Canada

[21] Appl. No.: 08/943,169

[22] Filed: Oct. 3, 1997

[51] Int. Cl.[7] .................................................. H04M 11/04
[52] U.S. Cl. .................................... 307/89; 340/310.01
[58] Field of Search ................................ 307/89.9, 91, 1; 340/310.01, 310.02, 310.03, 310.04, 310.05, 310.06, 310.07, 310.08

[56] References Cited

U.S. PATENT DOCUMENTS

| | | | |
|---|---|---|---|
| 1,547,242 | 7/1925 | Strieby | 340/310.01 |
| 3,895,370 | 7/1975 | Valentini | 340/310.01 |
| 4,199,761 | 4/1980 | Whyte et al. | 340/310.02 |
| 4,357,598 | 11/1982 | Melvin, Jr. | 340/825.01 |
| 4,379,284 | 4/1983 | Boykin | 340/825.7 |
| 4,471,399 | 9/1984 | Udren | 361/64 |
| 4,556,866 | 12/1985 | Gorecki | 340/310.01 |
| 4,602,240 | 7/1986 | Perkins et al. | 340/310.02 |
| 4,766,414 | 8/1988 | Shuey | 340/310.02 |
| 4,772,870 | 9/1988 | Reyes | 340/310.01 |
| 4,885,563 | 12/1989 | Johnson et al. | 340/310.01 |
| 4,903,006 | 2/1990 | Boomgaard | 340/310.01 |
| 5,257,006 | 10/1993 | Graham et al. | 340/310.01 |
| 5,646,962 | 7/1997 | Harrison . | |
| 5,691,691 | 11/1997 | Merwin et al. | 340/310.02 |

FOREIGN PATENT DOCUMENTS

| | | |
|---|---|---|
| 2 272 350 | 5/1994 | United Kingdom . |
| 2 307 158 | 5/1997 | United Kingdom . |
| WO94/09572 | 4/1994 | WIPO . |

Primary Examiner—Richard T. Elms
Attorney, Agent, or Firm—Lee, Mann, Smith, McWilliams, Sweeney & Ohlson

[57] ABSTRACT

A power line communications system has a power line having a plurality of conductors which carry communications signals. A set of communications signals are coupled to a set of the plurality of conductors, each signal being coupled to a respective one of the set of conductors and the phasor relationship of the set of communications signals is chosen such that radiation of communications signals from the power line is minimised. The phasor relationship may be achieved by phase shifting one or more of the signals. This method allows communications signals to be transmitted at higher power levels, thereby extending range of transmission, while minimizing radiation from the line.

16 Claims, 6 Drawing Sheets

COUPLING COMMUNICATIONS SIGNALS TO A POWER LINE

TECHNICAL FIELD

This invention relates to an apparatus and method for coupling communications signals onto a power line.

BACKGROUND OF THE INVENTION

It has been proposed to transport telecommunications signals over a power line. International Patent Application WO 94/09572 A1 describes such a network. Delivering a telecommunications service in this manner is attractive as it overcomes the need for installing cabling to each subscriber, which is one of the greatest costs in providing a new telecommunications network. Existing power lines are used to carry the telecommunications signals to subscribers.

There are a number of different methods for carrying telecommunications signals over a power line. One method modulates an RF carrier with the telecommunications information and couples the modulated RF carrier on to the power line. One of the potential problems with transporting RF signals over a power line is that of unwanted radiation of RF energy from the power line and other parts of the electricity distribution network. This is because the electricity distribution network was not designed to carry RF signals.

One significant point where radiation can occur is at the substations where electricity is transformed from high voltage (eg 6.6 or 11 kV) to low voltage (400 V). Substations have busbars which are typically mounted as a grid array on the substation wall. The busbars are shielded from view but often are electrically unscreened. This is because screening is considered unnecessary at the 50 Hz mains frequency. At RF frequencies the busbar array functions as an antenna, radiating the RF signals which it receives via the distribution cables into the surrounding area. This is undesirable as it causes interference with equipment operating at these frequencies. This radiation may also violate regulations on Electromagnetic Compatibility (EMC).

One of the solutions to minimise radiation from the busbars is to screen the busbar array, or to screen the entire substation building. Some modern substations are equipped with metal casing around the busbars. However, the majority of substations are unscreened brick structures. It is undesirable to renovate all of these structures to improve their screening as it increases the cost of providing a telecommunications service over the network.

An alternative to the radiation problem is to restrict the power at which the RF signals are transmitted over the network, such that radiation occurring at substations falls within acceptable limits. This causes problems with subscribers' equipment, particularly to those subscribers furthest from the point at which RF signals are injected onto the network. Subscriber equipment needs an acceptable signal to interference ratio in order to detect the wanted RF signals. With considerable interference on the network, this demands a reasonably high transmit power.

The problem of radiation at the substation is compounded by the fact that RF signals are usually injected onto the distribution network adjacent to the substation. The reason for injecting at this point is because one base station can easily be coupled to each of a group of low voltage (400 V) cables which all converge at the substation.

SUMMARY OF THE INVENTION

The present invention seeks to minimise the above problem.

A first aspect of the present invention provides a method of coupling communications signals to a power line having a plurality of conductors, the method comprising:
coupling a set of communications signals to a set of the plurality of conductors, each signal being coupled to a respective one of the set of conductors; and,
setting the phasor relationship of the set of communications signals such that radiation of communications signals from the power line is minimised.

Coupling a set of communications signals to the line and setting the phasor relationship of the communications signals such that radiation of communications signals from the power line is minimised has several advantages. Firstly, it allows communications signals to be coupled onto the power line at a higher power level while still maintaining the radiated power within a particular limit. Radiated power is a particular problem when the communications signals occupy frequency bands that are not specially allocated for power line communications and therefore where there could be an interference problem with other users. It has been found that an increase of some 10 or 20 dB in transmitted power level is possible with this technique compared with coupling a set of in-phase communications signals on to the conductors. This allows a base station to serve subscribers who are located further away from the base station, which maximises the coverage of the base station and minimise the number of additional base stations or repeaters which are needed.

Secondly, it has the advantage that communications signals can be coupled onto the power line at the busbars of a distribution substation. Coupling signals to the power line at a substation has the advantage that the signals propagate along all distribution lines coupled to that substation and therefore overcomes the need to separately couple signals onto each of the distribution lines. A further advantage of this arrangement is that the flow of return current contributed by the communications signals is minimised. This overcomes the need for an upgrade to the current-carrying capacity of the return conductor and also minimise radiation from the return conductor. Preferably the phasor relationship of the communications signals is arranged such that the vectorial sum of the set of communications signals is substantially equal to zero. The set of communications signals may comprise two or more signals.

Communications signals may be coupled to all or only some of the conductors which make up the power line. A typical power line has three phase lines (red, blue, yellow) and a neutral/earth line. A preferred arrangement applies three communications signals to the phase lines (red, blue, yellow) of the three-phase line, each signal being coupled to a respective one of the phase lines, the communications signals being applied between a phase line and neutral/earth. Preferably, n communications signals are coupled, one to each of n conductors, the n signals being offset from one another by substantially 360°/n.

The set of communications signals can be derived in several ways. A first way comprises receiving an input communications signal, dividing the input signal into the set of communications signals and choosing the phasor relationship of the set of communications signals by phase-shifting at least one of the divided signals. The phase-shifting can be achieved by a suitable weighting device.

An alternative way comprises directly generating a set of communications signals, such as by direct digital synthesis, one for each conductor of the set of conductors, which generated signals have a phasor relationship such that radiation of communications signals from the power line is minimised. The generated signals are modulated according to an input communications signal which it is intended to transmit.

One or more of the set of communications signals may be scaled in amplitude. This has the advantage of coping with differential loading effects on the power line conductors.

Advantageously the method further comprises monitoring a quantity which is indicative of the success of the step of setting the phasor relationship of the communications signals such that radiation of the communications signals is minimised and varying the phasor relationship of the set of communications signals according to the monitored quantity. The monitored quantity can be radiation of communications signals from the power line or a quantity which is indicative of the loading of the conductors of the power line.

The phasor relationship of the set of communications signals can be varied by applying perturbations to phasor settings for one or more of the communications signals.

Where it is desirable to serve subscribers who are located to one side of a point on the power line to which the signals are coupled, it is advantageous to combine the above-described method with a technique whereby, for each conductor in the set of conductors, one of the set of communications signals is coupled onto the conductor at a first position and a cancelling signal is coupled onto the conductor at a second position, spaced from the first position, such that the communications signal and the cancelling signal are arranged to destructively combine in a single direction of propagation along the line while enabling propagation of the communications signal along the line in the other direction.

The communications signals may be coupled directly to the conductors of a power line, to the busbars at a substation, or to some other part of an electricity or power distribution network. The network can comprise underground or overhead lines or a combination of these. Radiation of RF signals can be a particular problem with some types of overhead lines which do not have a co-axial like structure or benefit from the shielding of being buried underground. The technique may be used for transmitting signals in a downstream direction from a base station towards subscriber stations. Where subscriber stations have access to two or more conductors of a power line, the technique may be used for transmitting signals in an upstream direction from the subscriber station towards the base station.

Another aspect of the present invention provides apparatus for coupling communications signals to a power line having a plurality of conductors, the apparatus comprising:

a coupling device for coupling a set of communications signals to a set of the plurality of conductors, each signal being coupled to a respective one of the set of conductors; and, means for setting the phasor relationship of the set of communications signals such that radiation of communications signals from the power line is minimised.

A further aspect of the present invention provides a power line communications network incorporating apparatus as described above.

Preferred features may be combined as appropriate, and may be combined with any of the aspects of the invention as would be apparent to a person skilled in the art.

BRIEF DESCRIPTION OF THE DRAWINGS

For a better understanding of the invention, and to show by way of example how it may be carried into effect, embodiments will now be described with reference to the accompanying drawings, in which.

DESCRIPTION OF PREFERRED EMBODIMENTS

Figure 1:
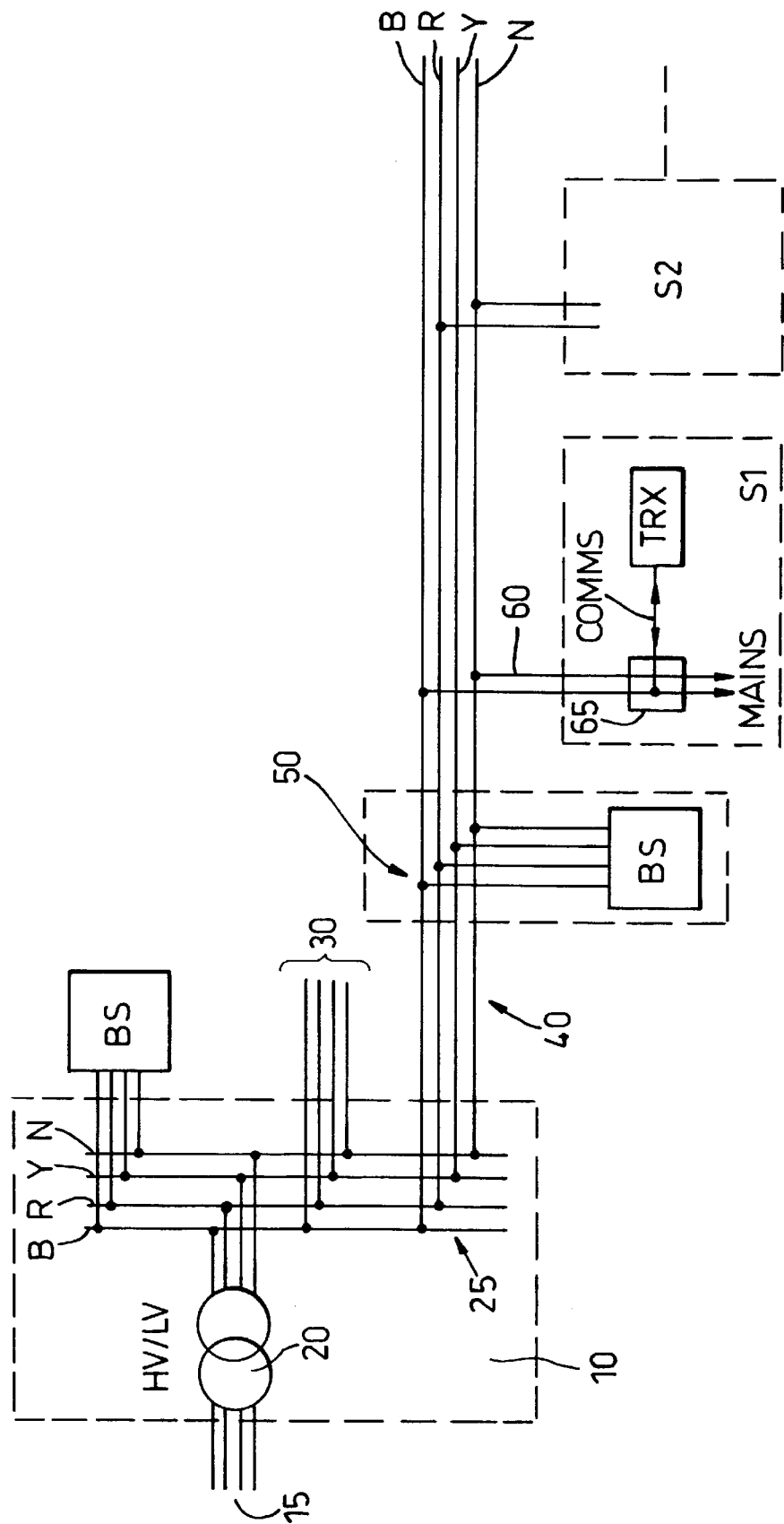
FIG. 1 shows an electricity distribution network which is adapted to carry telecommunications signals.

FIG. 1 shows an electricity distribution network which is adapted to carry telecommunications signals. Mains electricity enters the network from a high voltage 6.6 kV or 11 kV transmission line 15 and is transformed by transformer 20 at substation 10 into a 400 V supply which is delivered via busbars 25 and distribution cable 40 to customer premises S1 and S2. A substation 10 typically has between 4 and 8 such distribution cables of the kind s hown as 30, 40 leading from it, each distribution cable serving a number of subscriber premises. A distribution cable can extend for several hundreds of metres. Distribution cable 40 comprises a set of phase lines blue (B), red (R) and yellow (Y) and a neutral line (N) which are electrically insulated from one another. A full distribution network will usually include more of the premises shown as S1, S2 and will typically include a more elaborate tree-and-branch distribution network. Subscriber premises may receive a single phase electricity supply (230 V) or a three-phase electricity supply (400 V). Domestic subscriber premises usually receive a single-phase supply and neighbouring subscriber premises are usually coupled to different phase lines. In FIG. 1 subscriber S1 is shown coupled to the blue phase line and subscriber S2 is coupled to the red phase line. This helps to distribute the load of the network evenly across the three phases.

A base station BS couples communications signals, such as voice or data, onto the electricity distribution network. Base station BS can couple directly to the busbars 25 at substation 10, the busbars acting as a star point for serving all of the distribution cables 30, 40. Alternatively, base station BS may couple to one or more distribution cables 30, 40 shown as point 50 in FIG. 1. Where it is chosen to couple to the distribution cables it is more economical to do this at a point where the distribution cables are close together, such as close to the base station. Communications signals which are coupled onto the distribution cables propagate over the cables to transceiver stations TRX located at subscriber premises S1, S2. Subscriber premises coupled to one or more phase lines of distribution cable 40 by a branch line 60. A coupling unit 65 at the subscriber premises S1 couples communications signals to and from the branch cable 60 to serve transceiver unit TRX. In the upstream direction, communications signals are transmitted from the subscriber transceiver station TRX towards the base station BS.

Figure 2:
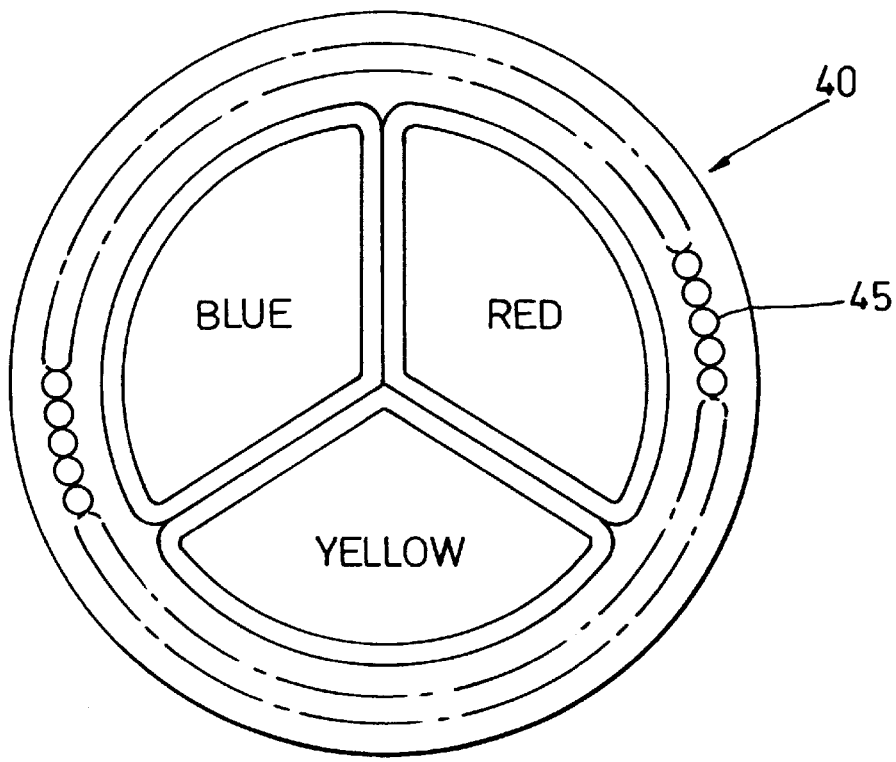
FIG. 2 shows, in cross-section, an example of a distribution cable that can be used in the network of FIG. 1.

FIG. 2 shows, in cross-section, an example of a three phase distribution cable 40 which is often used for underground lines. The cable has insulated red, blue and yellow phase lines. An outer section 45 of the cable has a combined earth and neutral. Many other types of cable are possible. A communications signals can be transmitted between a phase line and neutral or earth. Communications signals can be transmitted using a variety of line coding or modulation techniques, such as Frequency Shift Keying (FSK) modulation. Radio frequency (RF) carriers carry the communications information. Frequency bands in the range 1 to 30 MHz can be used, as these offer greater bandwidth for carrying communications signals, but it is also possible to use other frequencies. In some trials of equipment that applies communications signals to power lines in an in-phase relationship, transmit power has been limited to 50 mW, this figure corresponding to government regulations for spurious, i.e. out-of-band radiated RF power from radio transmitters. Applying communications signals to a line with a phasor relationship that minimise radiation allows a 10 to 20 dB increase in transmit power while still maintaining radiated power from a line within regulations.

Communications transceiver stations TRX are located at various distances from the base station BS. The quality of communications experienced by these transceiver units depends on the signal to noise ratio (SNR) at the transceiver stations. Factors affecting the signal to noise ratio are:

(i) attenuation between the base station and transceiver unit;

(ii) noise level on the power line; and, (iii) the power level at which the base station transmits.

Figure 3:
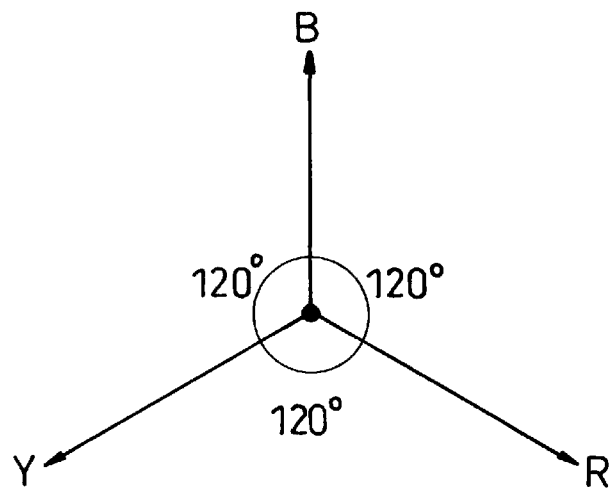
FIG. 3 shows the phasor relationship for a set of three communications signals which are coupled on to the network of FIG. 1.

As the power level at which base station BS transmits is increased, the amount of radiation emitted by the distribution network also increases. By applying the communications signals to the phase lines of the distribution network such that they vectorially sum to zero, it is possible to minimise the amount of radiation from the network, and therefore transmit at a higher power level. This allows a base station to serve subscribers located at a greater distance from the station than would have been possible without this arrangement while still maintaining radiated power within acceptable limits. FIG. 3 shows a phasor diagram which illustrates the phasor relationship between three communication signals, one for each of the phase lines B, R, Y. The set of communications signals are offset from one another by 120°. This phasor relationship should apply to all frequency components which form each of the communications signals. As an example, where each communications signal comprises two sine wave components at different frequencies, the phasor relationship between the set of such communications signals should maintain a 120° phase-shift between both frequency components of the signals. Applying the communications signals to the network with this relationship means that radiation from the lines, when viewed in the far-field is minimised. This can be applied more generally to situations where n communications signals are applied to n phase lines, the communications signals being offset from one another by 360°/n. All or only some of the phase lines in the power line may carry communications signals.

Figure 4:
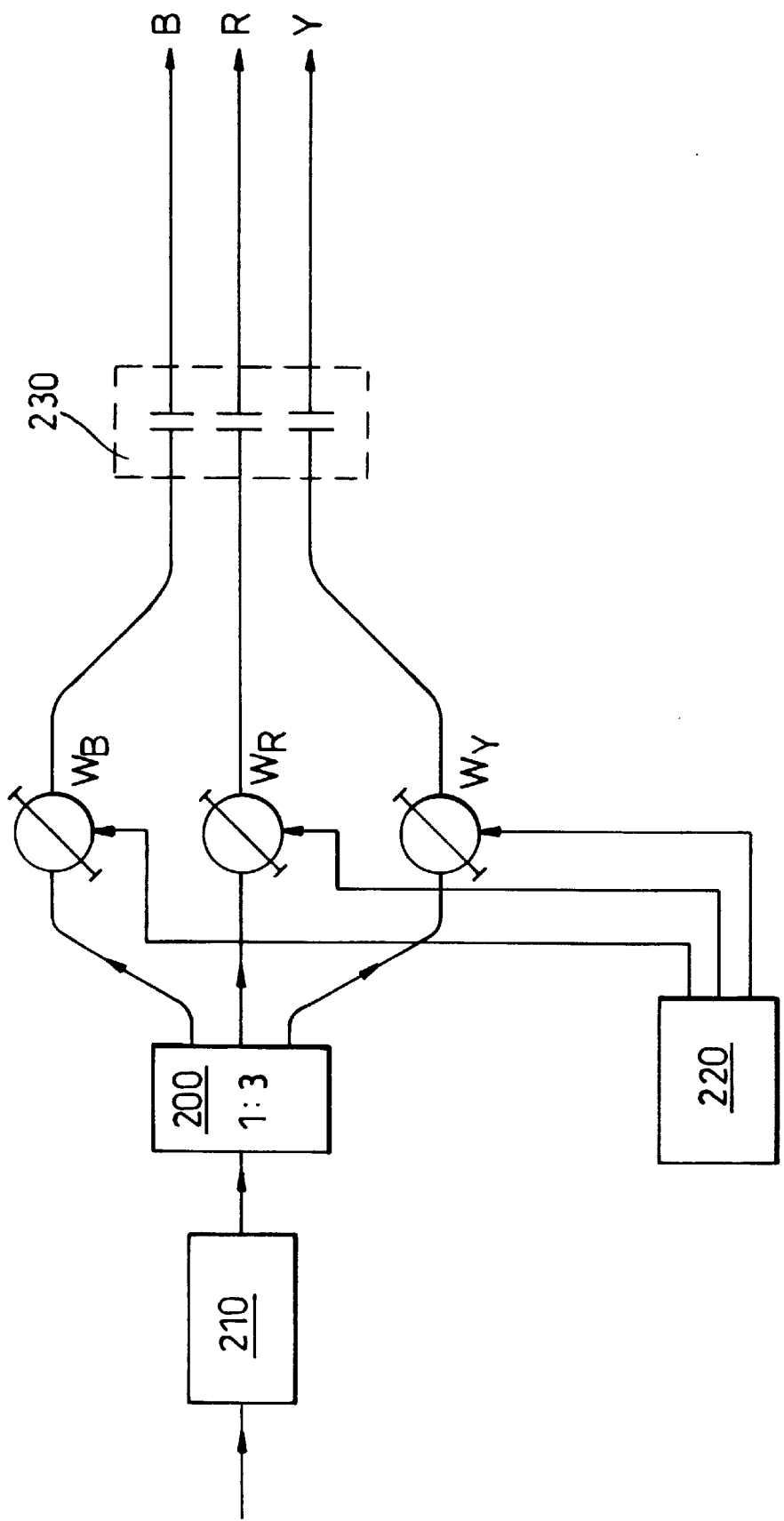
FIG. 4 shows a first arrangement for applying a set of communications signals to a power line with a phasor relationship.

FIG. 4 shows one arrangement which can be used at base station (BS) for applying communications signals to the power line with a phasor relationship. Modulator 210 outputs a modulated communications signal upon a RF carrier. This is divided by splitter 200 into three branches, one for each of the three phase lines.

Each branch includes a weighting device $W_B$, $W_R$, $W_Y$ which can phase-shift a signal at RF. The devices should be capable of applying a constant phase-shift across all frequency components within the bandwidth occupied by the communications signal. The outputs from the weighting devices are fed through a high-pass filter 230, which passes the RF communications signals and blocks mains current, and are finally applied to the phase lines B, R, Y at busbars 25 or distribution cable 50. Operation of the weighting devices is controlled by a control unit 220. This controls the magnitude of the phase shift which each device provides. The weighting devices may also be arranged to scale the signals in amplitude. The result of this process is that the power line carries a set of signals having the same information content but which are shifted in phase and scaled in amplitude with respect to one another to minimise radiation from the line.

Figure 5:
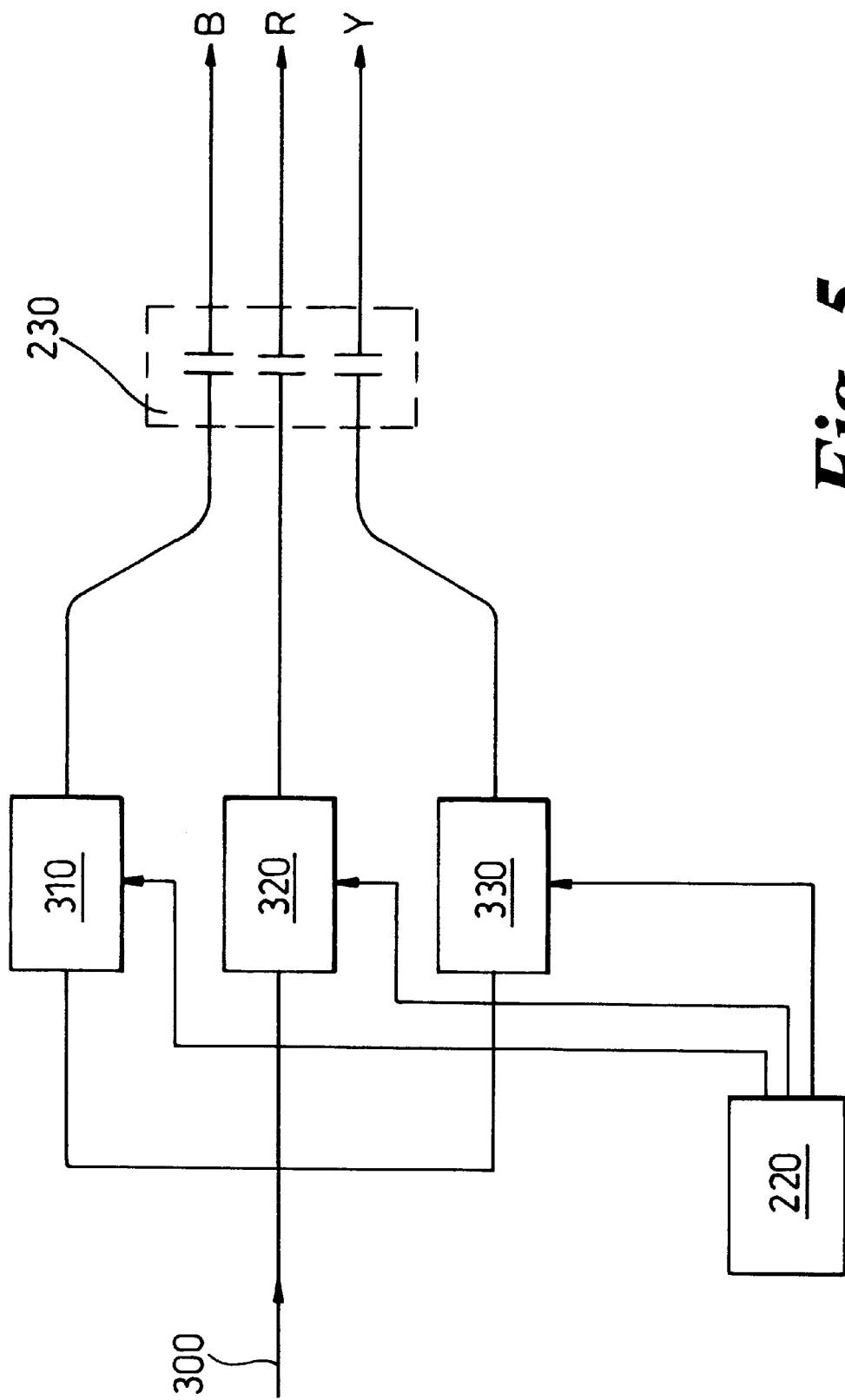
FIG. 5 shows a second arrangement for applying a set of communications signals to a power line with a phasor relationship.

FIG. 5 shows an alternative way of applying communications signals to the power line with a phasor relationship. Input 300 receives a communications signal at base band. This is fed to signal generating devices 310, 320, 330. The signal generating devices generate an RF signal having a particular phase and amplitude. The generated signal is preferably generated in a modulated form according to incoming data from input 300. For example, where modulation is by frequency shift keying (FSK), a carrier at a particular frequency representative of a particular data level '00', '01' etc. is generated. This technique is often called direct digital synthesis (DDS) as the signal is typically generated by retrieving a stored digital representation of the signal from an electronic memory and converting it to analogue form. As in FIG. 4, the generated signals are passed through a high-pass filter unit 230 before being applied to phase lines B, R, Y. Operation of the generating devices 310, 320, 330 is controlled by control unit 220 which controls the phase and amplitude of the generated signals. The result of this process is that the power line carries a set of signals having the same information content but which are shifted in phase and scaled in amplitude with respect to one another to minimise radiation from the line.

Figure 6:
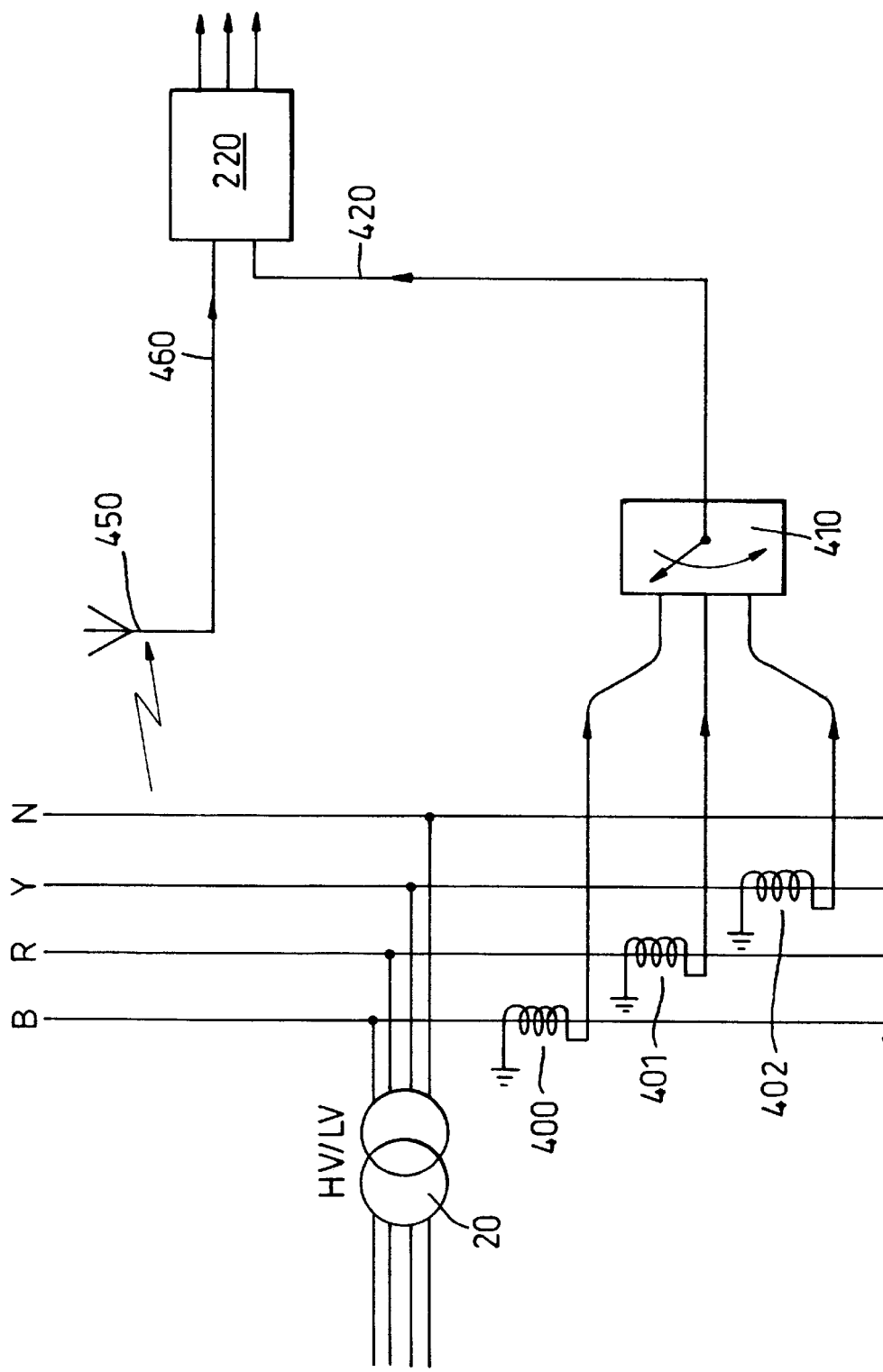
FIG. 6 shows arrangements for monitoring effectiveness of the arrangements of FIGS. 4 and 5.

The phasor relationship of the communications signals which is required to minimise radiation from the line should remain fairly static. For example, where three communications signals are applied to three lines, the three signals should be offset from one another by 120°. However, varying conditions on the electricity network can require a different phasor relationship for the communications signals to ensure that radiation is minimised. Differential electrical loading of the phase lines is one such condition. FIG. 6 shows two ways of monitoring the network to ensure that an optimum phase relationship is established for the communications signals.

The upper part of FIG. 6 shows an antenna 450 located in the far-field of busbars 25. This senses radiation from the busbars and feeds a signal 460 to controller 220 for adjusting values of the weighting or signal generating devices at base station BS. Antenna 450 should be located near the busbars, or some other point of the network which requires monitoring, so as to sense the combined effect of the radiations from the lines rather than the individual contributions of a particular line.

The lower part of FIG. 6 shows an alternative arrangement for determining the effectiveness of the phasor relationship. Sensing coils 400, 401, 402 are arranged one per phase line to detect signals present on respective busbars B, R, Y. The coils can conveniently be inductive coils which are wound around the busbar or laid closely adjacent to it. Sensing is also possible by a capacitive link or by one or more antennas located close to the busbars. Outputs of the sensing coils are either fed directly to control unit 220 or are conveyed, one at a time, by switch 410 to control unit 220 in a multiplex fashion. Sensing coils 400, 401, 402 or equivalent devices provide an indication of loading of each of the phase lines. As described above, differential loading of the phase lines requires adjustment to the phasor relationship of the communications signals applied to those phase lines.

Figure 7:
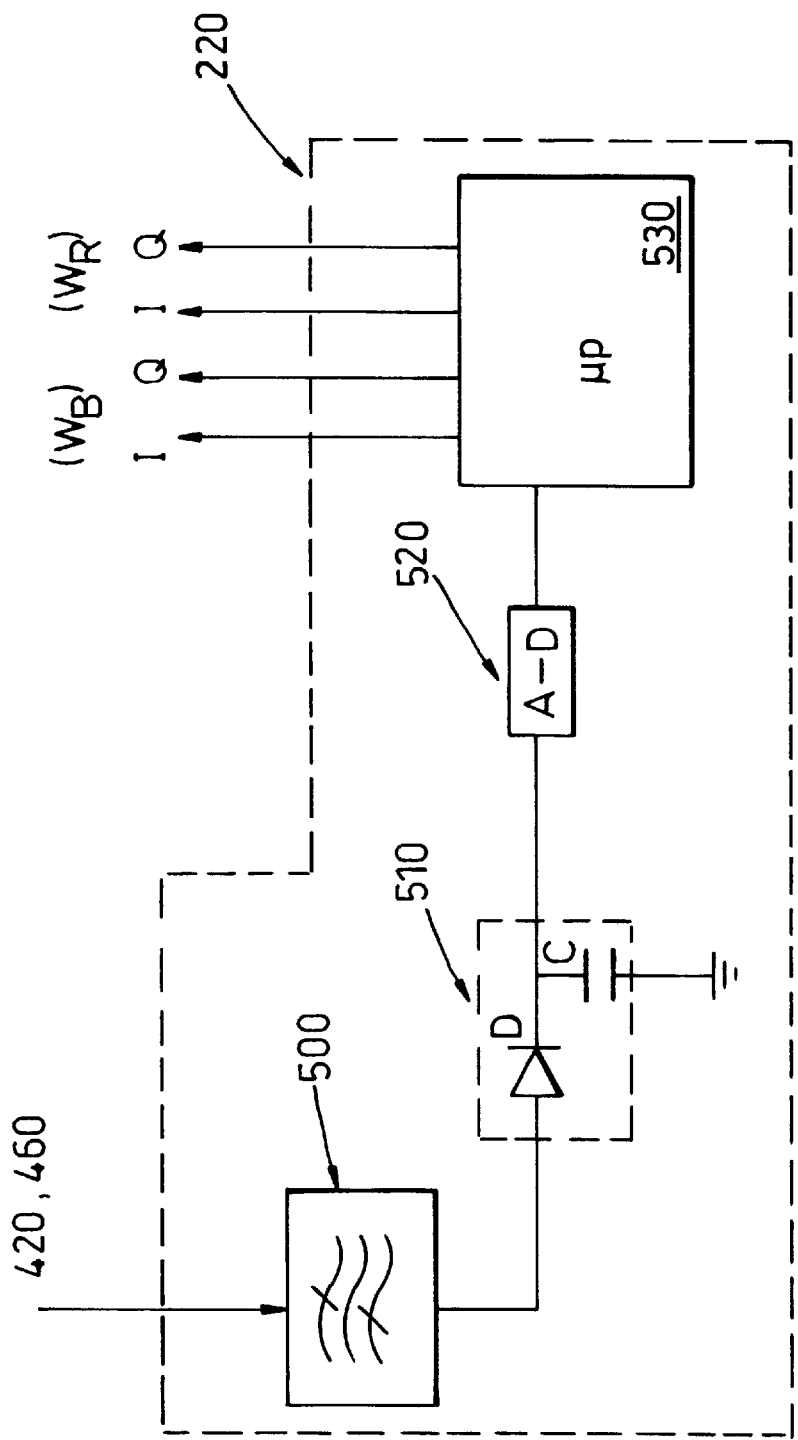
FIG. 7 shows an example of a control unit for use with the arrangements of FIGS. 4 and 5.

FIG. 7 shows an example of the control unit 220. A monitoring signal 420, 460 is applied to a channel filter 500 which passes only those frequencies which are of interest. A power detector 510, shown simply as a diode detector D and capacitor C provide a power measurement which is applied to an analogue-to-digital converter 520. The output of the A-to-D converter is fed to a microprocessor 530 which performs an adjustment of the control signals which are fed to the weighting devices or signal generating devices which establish the phasor relationship of the communications signals. FIG. 7 shows microprocessor 520 outputting two sets of weight control signals for weights $W_B$, $W_R$. A weight can conveniently be controlled by an in-phase (I) and quadrature (Q) control signal. Microprocessor 530 can perform a perturbation process which works by applying steps in the size of the I and Q weight values and monitoring the success of the changes. The algorithm can work by successively changing I up, I down, Q up, Q down. After these four steps have been performed, the change in I or Q which had the best effect is adopted. The process continues until the best cancellation effect is achieved.

It is also possible to vary the control signals by performing a correlation technique.

Applicant's co-pending International Patent Application No. PCT/GB97/02028 describes a technique whereby the direction of propagation of communications signals along a power line is controlled. This is achieved by coupling a wanted communications signal onto the line at a first position, and coupling a second, cancelling signal, onto the line at a second position, spaced from the first position such that the wanted signal and the cancelling signal destructively combine in a single direction of propagation along the line. The cancelling signal is preferably a phase-shifted version of the wanted signal which is divided from the wanted signal.

This technique allows a base station BS to couple communications signals onto a distribution cable (such as at point 50 in FIG. 1) and control propagation such that communications signals propagate only in the direction towards subscribers, and not towards substation 10. The technique described in this application whereby a set of communications signals are applied to a set of phase lines such that their phasor relationship sums to minimise radiation from the line can be combined with the technique described in applicant's co-pending application. This affords the combined advantages that communications signals propagate only along a desired section of the distribution cable, and also that propagation of those signals along the chosen section of line causes minimum radiation.

I claim:

1. A method of coupling communications signals to a power line having a plurality of conductors, which signals are prone to radiate from the line, the method comprising:
   coupling a set of communications signals to a set of the plurality of conductors, each signal being coupled to a respective one of the set of conductors for propagation along the conductor, the set of communications signals having a phasor relationship; and,
   setting the phasor relationship of the set of communications signals such that radiation of the communications signals from the power line is minimised as the signals propagate along the line.

2. A method according to claim 1 wherein the phasor relationship of the communications signals is arranged such that the vectorial sum of the set of communications signals is substantially equal to zero.

3. A method according to claim 2 wherein n communications signals are coupled, one to each of n conductors, the n signals being offset from one another by substantially 360°/n.

4. A method according to claim 1 further comprising:
   receiving an input communications signal;
   dividing the signal into the set of communications signals; and,
   choosing the phasor relationship of the set of communications signals by phase-shifting at least one of the divided signals.

5. A method according to claim 1 further comprising:
   receiving an input communications signal;
   generating the set of communications signals, one for each conductor of the set of conductors, according to the input signal, the phasor relationship of the set of generated communications signals being such that radiation of communications signals from the power line is minimised.

6. A method according to claim 5 wherein the step of generating the set of communications signals is performed by direct digital synthesis.

7. A method according to claim 1 further comprising amplitude scaling at least one of the set of communications signals.

8. A method according to claim 1 further comprising:
   monitoring a quantity which is indicative of the success of the step of setting the phasor relationship of the communications signals such that radiation of the communications signals is minimised; and,
   varying the phasor relationship of the set of communications signals according to the monitored quantity.

9. A method according to claim 8 wherein the monitored quantity is radiation of communications signals from the power line.

10. A method according to claim 8 wherein the measured quantity is loading of the conductors of the power line.

11. A method according to claim 8 wherein the step of varying the phasor relationship comprises applying perturbations to phasor settings for one or more of the communications signals.

12. A method according to claim 1 wherein the coupling is performed at a substation of an electricity distribution network.

13. A method according to claim 1 wherein the power line is a three-phase power line and wherein three communications signals are applied to the power line, one to each of the phase lines.

14. A method according to claim 1 further comprising, for each conductor in the set of conductors,
   coupling one of the set of communications signals onto the conductor at a first position;
   coupling a cancelling signal onto the conductor at a second position, spaced from the first position;
   such that the communications signal and the cancelling signal are arranged to destructively combine in a single direction of propagation along the line while enabling propagation of the communications signal along the line in the other direction.

15. Apparatus for coupling communications signals to a power line having a plurality of conductors, which signals are prone to radiate from the line, the apparatus comprising:
   a coupling device for coupling a set of communications signals to a set of the plurality of conductors, each signal being coupled to a respective one of the set of conductors for propagation along the conductor, the set of communications signals having a phasor relationship; and, a device for setting the phasor relationship of the set of communications signals such that radiation of the communications signals from the power line is minimised as the signals propagate along the line.

16. A power line communications network incorporating apparatus according to claim 15.

* * * * *